April 17, 1956 M. J. ANTOS ET AL 2,742,611
AUTOMATIC INDICATOR FOR TESTING EQUIPMENT
Filed June 13, 1951
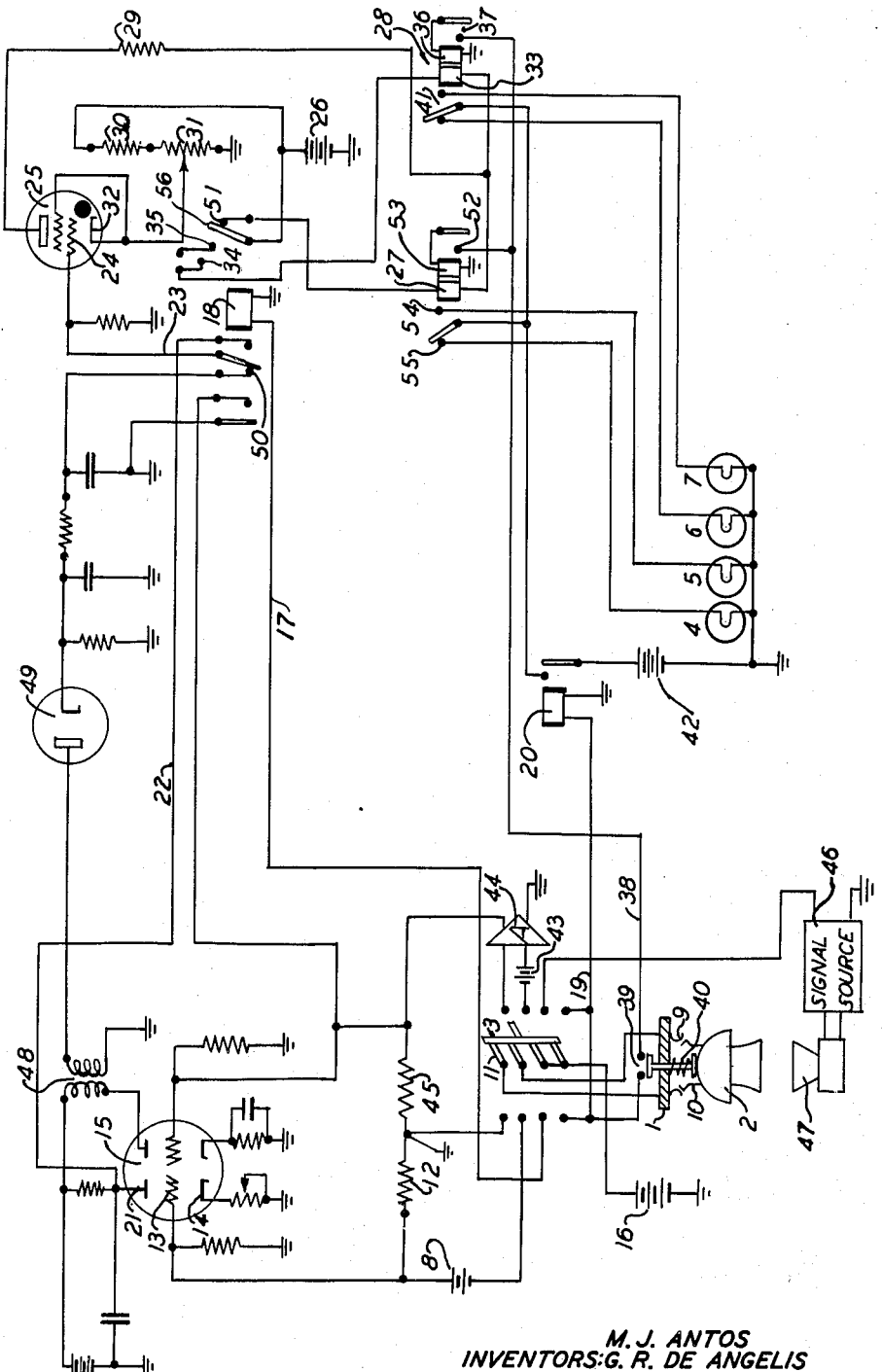
INVENTORS: M. J. ANTOS
G. R. DE ANGELIS
E. H. TOWLE
BY
ATTORNEY

United States Patent Office 2,742,611
Patented Apr. 17, 1956

2,742,611

AUTOMATIC INDICATOR FOR TESTING EQUIPMENT

Maximilian J. Antos, Brooklyn, George R. De Angelis, Yonkers, and Edmund H. Towle, Tuckahoe, N. Y., assignors to Western Electric Company, Incorporated, New York, N. Y., a corporation of New York Application June 13, 1951, Serial No. 231,416

9 Claims. (Cl. 324—73)

This invention relates to indicator circuits for testing equipment and particularly to an indicator circuit suitable for equipment used in making the same series of tests on a succession of similar apparatus units.

In testing large numbers of apparatus units in succession to determine whether each unit meets each of a series of requirements, it is common practice to set up test equipment in such a way that the output level of the equipment is the criterion of the good or defective condition of the units under test. In many cases this output level is measured by a meter or volume indicator which must be read by the operator in deciding whether to pass or reject each unit. The use of such a meter results in frequent errors of observation and when the performance of a particular unit is marginal in any test it often is necessary to repeat the test to determine definitely whether or not the unit is within the prescribed limits.

The object of this invention is an indicator which substantially eliminates errors of observation and gives an immediate positive indication of the condition of each unit tested with respect to each of the required tests.

According to the invention there are established potential values which correspond to the limiting magnitudes of the various properties for which the units are to be tested and these potentials are applied to the control anode of a gas-filled tube to fire the tube only when the response or characteristic of the unit is above (or below) the limiting magnitude in each case. A suitable set of "good" and "bad" indicators such as lamps and a relay for selectively energizing the indicators are provided for each test requirement and the relays are successively associated with the anode circuit of the gas-filled tube so that for each test of an apparatus unit one or the other of the indicators is energized according to the result of the particular test.

The invention is applicable to testing any number of apparatus units characteristics in succession and it ordinarily will be found most useful when used in conjunction with complex testing equipment not forming part of the present invention. The general features of the invention will be understood, however, from the following detailed description of the embodiment shown in the drawing which is a circuit adapted particularly for indicating the results of two tests per unit, namely, the resistance and the transmission or signal output level of telephone transmitters. The purpose of the resistance test is merely to determine whether the resistance of the transmitter exceeds a permissible maximum value and during this test the transmitter ordinarily is agitated by means which form no part of this invention and are therefore not shown. In the response or output level test the transmitter is subjected to an acoustic sound field of desired frequencies and of a definite intensity and the electrical output of the transmitter is checked to determine whether it is of at least a minimum desired value.

In the drawing a fixture 1 is adapted to hold and connect into the circuit a succession of telephone transmitters 2 each of which is subjected to a series of tests by the operation of switching means 3 and the result of each test is shown automatically by the selective energization of the indicators 4, 5, 6 and 7. In this circuit the switching means is shown as a simple double-throw switch which can be closed to the left for testing the resistance of a transmitter and to the right for testing the output or response. It will be understood that when the invention is used to make more than two tests per unit the switching means 3 will have a correspondingly larger number of positions and that additional relays and indicators will be provided for these additional tests.

With a transmitter in test position and the switch closed to the left there will be current in the circuit extending from the source 8 through the switch contact 9 of the fixture, the transmitter under test, fixture contact 10, plate 11 of the switch and resistor 12 to the other terminal of the source 8 thereby creating in resistor 12 a potential drop which is impressed between the grid 13 and cathode 14 of the vacuum tube 15. Current source 8 and various others referred to below are shown as separate batteries for convenience but it will be understood that in commercial apparatus, according to the invention, these current sources ordinarily would be a single conventional power supply unit. The closing of switch 3 to the left also connects the source 16 to conductor 17 to operate a switching relay 18 and to conductor 19 to energize relay 20 which is slow to operate for reasons to be described.

Upon the operation of relay 18 the potential of plate 21 of tube 15 is applied over conductors 22 and 23 to the control anode 24 of a gas-filled tube 25. By proper choice of the potential at source 8 and of the value of resistor 12, the positive potential at control anode 24 is made just sufficient to fire the tube 25 when the resistance of transmitter 2 is of maximum permissible value. The tube 25 therefore fires for all transmitter resistance values up to the maximum but does not fire when a unit under test has a resistance greater than this maximum value. It will be noted that plate potential for the tube 25 is supplied from a source 26 through contacts on relay 18, the operating winding of relay 27 or 28 and resistor 29. The source 26 also produces potential drop in resistors 30 and 31 for providing suitable bias for the cathode 32 so that the tube fires when the control anode is at some definite potential such as +48 volts.

When the tube 25 fires with relay 18 operated as previously described, the operating winding 33 of relay 28 is connected in the anode circuit through contacts 34 and 35 of the relay and upon operation relay 28 completes a holding circuit from ground through its holding winding 36, contact 37 and conductor 38 to current source 16 through switch 3 in either test position and contacts 39 held closed by the compression of a spring 40 whenever a transmitter is in position in the fixture 1. The operation of relay 28 closes contact 41 associated with the "good" or green lamp 7 and then when the slow operating relay closes its contacts the lamp 7 is lighted by current from the source 42 to indicate that the resistance of the transmitter under test is satisfactory. On the other hand if the transmitter resistance is too high the potential developed across resistor 12 will not be sufficient to produce firing potential for the tube 25 and relay 28 therefore remains unoperated. In this case, when the slow relay 20 operates, the "bad" or red lamp 6 is lighted by current from source 42 through the back contact of relay 28 to indicate that the transmitter resistance is unsatisfactory. The operating time of relay 20 is made long enough for the circuit to reach a stable condition so that only one lamp of the two lamps provided for each test is lighted during each test to give a single positive indication. Although the red or bad lamp of the test not being conducted is also energized, the test indication is made only by the pair of lamps corresponding to the test being conducted as determined by the position of switch 3.

To test the transmission or output level of the transmitter the switch 3 is closed to the right to connect the unit through a source of current 43 to an amplifier 44, the output of which is applied to resistor 45. In this position the switch 3 connects current source 16 to the slow operating relay 20 as before and to a signal source 46 for supplying test frequencies to a receiver 47 mounted in front of the transmitter under test. In accordance with well known practice in transmitter testing, the source 46 generates a signal varying in frequency cyclically between definite limits at a known rate and for a definite time to create a standard acoustic sound field at the mouthpiece of the transmitter. The alternating potentials developed across resistor 45 by the electrical output of the transmitter are further amplified in the right hand triode of tube 15 and applied through a transformer 48 to a rectifier 49. Since relay 18 is not operated for this test the rectified signal potential is applied through back contact 50 of relay 18 and conductor 23 as a positive bias to the control anode 24 of tube 25. In this case the gain of amplifier 44, the value of resistor 45 and other circuit constants are so chosen that the minimum acceptable transmitter response is just sufficient to produce firing potential at the control anode. A "good" transmitter therefore will fire the tube causing relay 27 to operate over a circuit extending through back contact 51 of relay 18. In operating relay 27 completes its holding circuit from the source 16 through switch 3, the test fixture contacts 39, its own contact 52 and holding winding 53 to ground. Then on operation of relay 20 the "good" lamp 5 is lighted by current from source 42 through contact 54 of relay 27 to indicate a satisfactory transmitter output or efficiency. If the response of the transmitter is too low, however, the tube 25 does not fire and relay 27 remains released so that upon operation of relay 20 the red lamp 4 is lighted through back contact 55 to show that the unit must be rejected for poor response.

When the transmitter unit is removed from the fixture the spring 40 opens contacts 39 to break the holding circuits of relays 27 and 28 and since either the operation or release of relay 18, by operation of the switching means 3, resets the tube 25 by momentarily opening its plate circuit, the tube is conditioned automatically for the next test. To insure that the plate circuit of tube 25 will be open long enough for the tube to reset each time the relay is operated or released, the circuit through relay 27 must be opened an appreciable time before the circuit through relay 28 is closed and vice versa. Without this time delay, false results may be produced especially when switch 3 is operated rapidly. This time delay is assured in a simple reliable manner by connecting the operating coil of relay 28 to contact 34 so that both contacts 34 and 35 must be closed to the movable actuating armature 56 before battery 26 is connected to relay 28 when the relay 18 is energized. The time required for the armature to sweep the contact 35 to contact 34 is sufficient for this purpose. Conversely, when the relay 18 releases, the plate circuit of the tube is opened first at contact 34 then at contact 35 and finally reestablished by the closing of contact 51.

It is to be understood that the above description is merely illustrative of the invention and that other circuits and variations in procedure involving the principles of the invention and falling within the scope thereof may be devised by those skilled in the art.

What is claimed is:

1. In a testing system for subjecting apparatus units to a plurality of tests in succession, means for producing a potential variable with the result of each test, a gas-filled tube having input and output circuits, means for applying said potential to the input circuit, said output circuit being fired by a predetermined value of said potential, a pair of indicators for each test, a relay for each pair of indicators for selecting one of the indicators for operation and means for selectively connecting one of the relays in the output circuit of the tube for each test.

2. In an indicating system for testing equipment the combination with switching means for establishing circuits for subjecting an electrical apparatus unit to a succession of tests and an impedance for each test for conducting a current variable with the result of the test, of a pair of indicators for each test, a relay for each pair of indicators for actuating either one of each pair of indicators, electronic means controlled in accordance with the currents in the impedances and means for selectively connecting each of the impedances and the corresponding relay to the electronic means during each test.

3. In an indicating system for testing equipment the combination with switching means for establishing circuits for subjecting an electrical apparatus unit to a succession of tests and an impedance for each test for conducting a current variable with the result of the test, of a pair of indicators for each test, a relay for each pair of indicators for actuating either one of each pair of indicators, an electron tube having control and output circuits, circuits established in each position of the switching means for selectively associating the impedances with the control circuit and the corresponding relay with the output circuit and means for disabling all the indicators for a timed interval after the beginning of each test.

4. In an indicating system for testing equipment a plurality of pairs of devices for indicating the satisfactory or unsatisfactory result of each of a series of tests, a relay for each pair of devices for actuating either one of each pair of devices, a gas-filled tube, a plurality of firing circuits for the tube, each including an impedance for producing a firing potential variable with the result of a test, each said impedance having a value such that the firing potential for a limiting condition of test is just sufficient to fire the tube, a plurality of output circuits for the tube, each including one of the relays and means for selectively connecting corresponding firing and output circuits to the tube to indicate successively the results of a series of tests.

5. In a testing system the combination with a fixture for receiving a succession of apparatus units to be tested, a multi-position switch for successively establishing circuits for subjecting the units to a series of tests and an impedance for each test for producing a potential difference variable with the characteristic of the unit being tested, of a pair of indicating devices for each test, a relay for each pair of devices, a gas-filled tube having control and anode circuits and means controlled by the switch for connecting a different one of the impedances to the control circuit and a different one of the relays to the anode circuit in each of the test positions of the switch.

6. In a testing system according to claim 5, a source of relay holding power, a holding circuit for the relays including normally open contacts held closed by a unit when in test position in the fixture and contacts on the switch for connecting the source to the holding circuit only when the switch is in a test position.

7. In a testing system according to claim 5, means effective when the switch is moved from one test position to another to hold the anode circuit of the tube open for a predetermined time sufficient for the tube to reset.

8. In a testing system a pair of indicating devices for each of a plurality of tests to be performed by the system, a relay for actuating either one of each pair of devices, a gas-filled tube having a control anode and an output circuit for selectively operating the relays, an impedance for each test for producing a potential variable with the result of the test, switching means operable to a plurality of test positions and circuits established in each position of the switching means for operatively connecting one of the impedances to the control anode of the tube and for connecting one of the relays in the output circuit.

9. A system according to claim 6 including a source of power, a circuit between the source and the indicating devices having a normally open contact for disabling all the devices and means operative in each test position of the switching means for closing said contact after the predetermined time required to complete a test.

References Cited in the file of this patent

UNITED STATES PATENTS 2,584,680    Doncyson _____ Feb. 5, 1952